United States Patent [19]

Castonguay

[11] 4,447,682
[45] * May 8, 1984

[54] ISOLATION SHIELDS FOR A 2500-4000 AMP CIRCUIT BREAKER COMPARTMENT

[75] Inventor: Roger N. Castonguay, Terryville, Conn.

[73] Assignee: General Electric Company, New York, N.Y.

[ * ] Notice: The portion of the term of this patent subsequent to May 31, 2000 has been disclaimed.

[21] Appl. No.: 349,335

[22] Filed: Feb. 16, 1982

[51] Int. Cl.³ .............................................. H01H 9/00
[52] U.S. Cl. .............................. 200/50 AA; 361/335; 361/345
[58] Field of Search ............... 361/335, 337, 339, 343, 361/345, 390, 391; 200/50 AA, 50 R, 304, 305

[56] References Cited

U.S. PATENT DOCUMENTS

| 2,128,149 | 8/1938 | Linde | 361/339 X |
| 3,614,350 | 10/1971 | Eichelberger | 200/50 AA |
| 4,386,246 | 5/1983 | Castonguay | 361/345 |

FOREIGN PATENT DOCUMENTS 674135  7/1979  U.S.S.R. ............................... 361/337

Primary Examiner—J. V. Truhe
Assistant Examiner—Greg Thompson
Attorney, Agent, or Firm—Richard A. Menelly; Walter C. Bernkopf

[57] ABSTRACT

A shield mechanism for isolating line and load stabs within a 2500-4000 ampere circuit breaker compartment is disclosed having a primary operating arm for operating a lower moveable shield and an upper moveable shield interconnected by a reversing bell crank link. Interconnection between the bell crank link and an intermediate lever is made by means of a lower expansion link. The corresponding downward motion fo the lower expansion link, when the circuit breaker is inserted in the compartment, forces the upper moveable shield to pivot into an open clockwise direction by connection between the upper moveable shield, the bell crank link and an upper expansion link against the force exerted by a return spring. Direct connection between the lower moveable shield and the intermediate lever forces the lower moveable shield into an open counterclockwise direction. Removing the circuit breaker from the compartment releases the shield operating mechanism primary operating arm from contact with the back surface of the breaker. This allows the primary operating arm to return in a clockwise direction under the return spring force. Direct connection between the intermediate lever and the lower moveable shield forces the lower moveable shield into a closed clockwise direction while the upper moveable shield simultaneously moves into a closed, counterclockwise direction by means of the reversing bell crank link and the return spring force.

8 Claims, 3 Drawing Figures

ISOLATION SHIELDS FOR A 2500-4000 AMP CIRCUIT BREAKER COMPARTMENT

BACKGROUND OF THE INVENTION

In order to isolate the line and load stabs within a circuit breaker compartment, shield devices are proposed for installation intermediate the compartment stabs and the corresponding line and load plugs on the circuit breaker when the circuit breaker is removed from the compartment. The following U.S. patent applications disclose various shield arrangements for installation within circuit breaker compartments. "Safety Shield Assembly For a Drawout Type Circuit Breaker", Ser. No. 322,347, filed Nov. 18, 1981; "Interchangeable Shield Arrangement For a Circuit Breaker", Ser. No. 322,348, filed Nov. 18, 1981; "Shield Assembly For AKR Circuit Breaker Compartments", Ser. No. 328,336, filed Dec. 7, 1981 and "Shield Assembly For 800 to 1600 Ampere Circuit Breaker Compartments", Ser. No. 328,337, filed Dec. 7, 1981, U.S. Pat. Nos. 3,614,350, 4,183,073, and 4,285,026 also describe various mechanisms for isolating line and load stabs within circuit breaker compartments. The aforementioned patent applications and U.S. patents are incorporated herein for purposes of reference. The instant invention relates to an isolation shield mechanism for insertion within higher ampere circuit breaker compartments in the 2500-4000 ampere range which occupy a substantial portion of the available compartment space. The invention provides a fast operating shield mechanism which allows the upper and lower shields to rapidly move away from in front of the compartment power and load stabs before the circuit breaker is half way within the compartment.

SUMMARY OF THE INVENTION

A rapid circuit breaker compartment shield operating mechanism employs a primary operating arm and an intermediate lever in combination with an interconnected link arrangement consisting of a lower expansion link, a reversing ball crank link and an upper expansion link connecting between an upper and a lower moveable shield to isolate line and load stabs within a circuit breaker compartment when the breaker is removed from the compartment and to expose the line and load stabs when the breaker is inserted within the compartment. The primary operating arm contacts the back lower surface of the breaker and forces the interconnected link arrangement to move in a downward direction against a return spring force. Connection between the intermediate lever and the lower moveable shield forces the lower moveable shield into an open counterclockwise direction while connection between the upper expansion link and the upper moveable shield forces the upper moveable shield into an open clockwise direction. Removing the breaker from the compartment allows the link arrangement to move upward under the return spring force causing the upper and lower moveable shutters to move in opposite directions into closed positions.

DESCRIPTION OF THE PREFERRED EMBODIMENT

Figure 1:
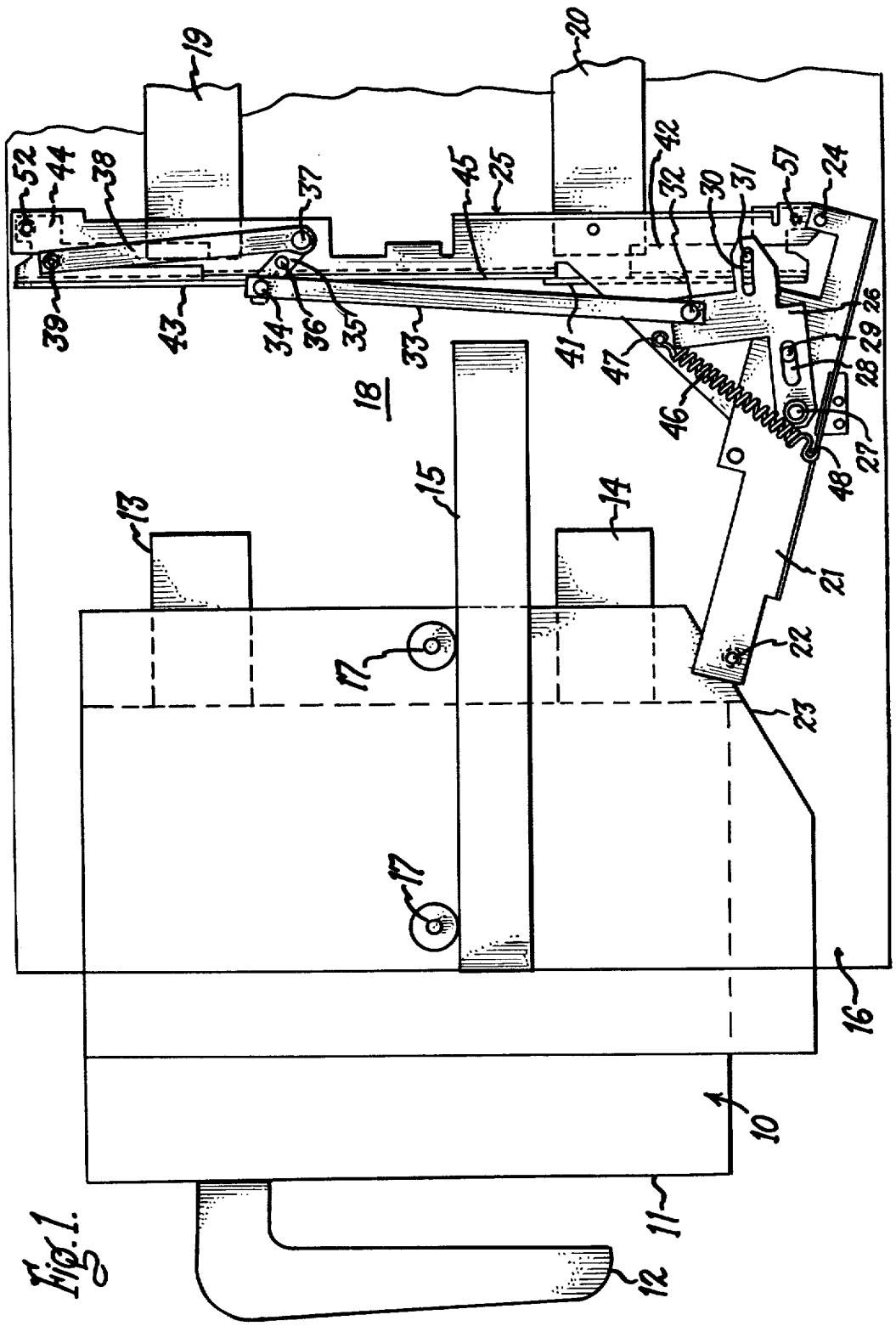
FIG. 1 is a side view of a circuit breaker compartment containing the shield operating mechanism of the invention with the breaker partially removed.

FIG. 1 contains a molded case circuit breaker 10 having a 2500 to 4000 ampere rating and a forward control panel 11 along with an operating handle 12. On the back portion of breaker 10 are arranged three line plugs 13 and load plugs 14. A fixed track 15 is affixed to the sides of a circuit breaker compartment 16 for supportng moveable rollers 17, two on each side of breaker 10. A shield operating mechanism 18 is located within compartment 16 for the purpose of isolating line stabs 19 and load stabs 20 when breaker 10 is at least partially removed from the compartment 16. Shield operating mechanism 18 contains a primary operating arm 21 having an extending actuator pin 22 for contacting with the back lower surface 23 of breaker 10. Primary operating arm 21 is pivotally attached to a right side frame member 25 by means of pivot 24 and an intermediate lever 26 is pivotally connected to primary operating arm 21 by means of pivot 27 and contains a first slot 28 supported by a first pin 29 extending from primary operating arm 21 and a second slot 30 supported by a second pin 31 which is attached to lower hinge 42. Intermediate lever 26 is attached by means of bottom pin 32 to lower expansion link 33 which is attached by means of top pin 34 to a reversing bell crank link 35. Bell crank link 35 is pivotally connected to right side frame 25 by means of pivot 40 and connects by means of pin 37 with an upper expansion link 38 which is connected at its opposite end with an upper hinge 44 by means of pin 39. A lower moveable shield 41 is fixedly attached to lower shield hinge 42 which is pivotally attached to right side frame 25 by means of pivot 51. An upper moveable shield 43 is fixably attached to upper shield hinge 44 which is pivotally attached to right side frame 25 by means of pivot 52. A return spring 46 connects between pin 47 on right side frame 25 and an opening 48 in primary operating arm 21. A stationary shield 45 is positioned on right side frame 25 between upper moveable shield 43 and lower moveable shield 41 in order to provide a stop for both shields in their closed position.

When breaker 10 is moved along rollers 17 and track 15 to within compartment 16, lower surface 23 contacts primary operating arm pin 22 causing primary operating arm 21 to rapidly move in a downward direction against the force of return spring 46. First pin 29 moves forward within first slot 28 until contact is made between first pin 29 and the forward edge of first slot 28 causing intermediate lever 26 to follow the downward motion of primary operating arm 21. Second pin 31 in contact with the rear surface of second slot 30 rapidly moves lower hinge 42 and attached lower moveable shield 41 in a downward counterclockwise direction to expose load stab 20. The downward motion of intermediate lever 26 causes lower expansion link 33 to move in a downward direction and rotates reversing bell crank link 35 counterclockwise about pivot 36. Upper expansion link 38 is moved into the upwards direction and forces upper hinge 44 and attached upper moveable shield 43 to rotate in an upward clockwise direction to expose line stab 19.

Figure 2:
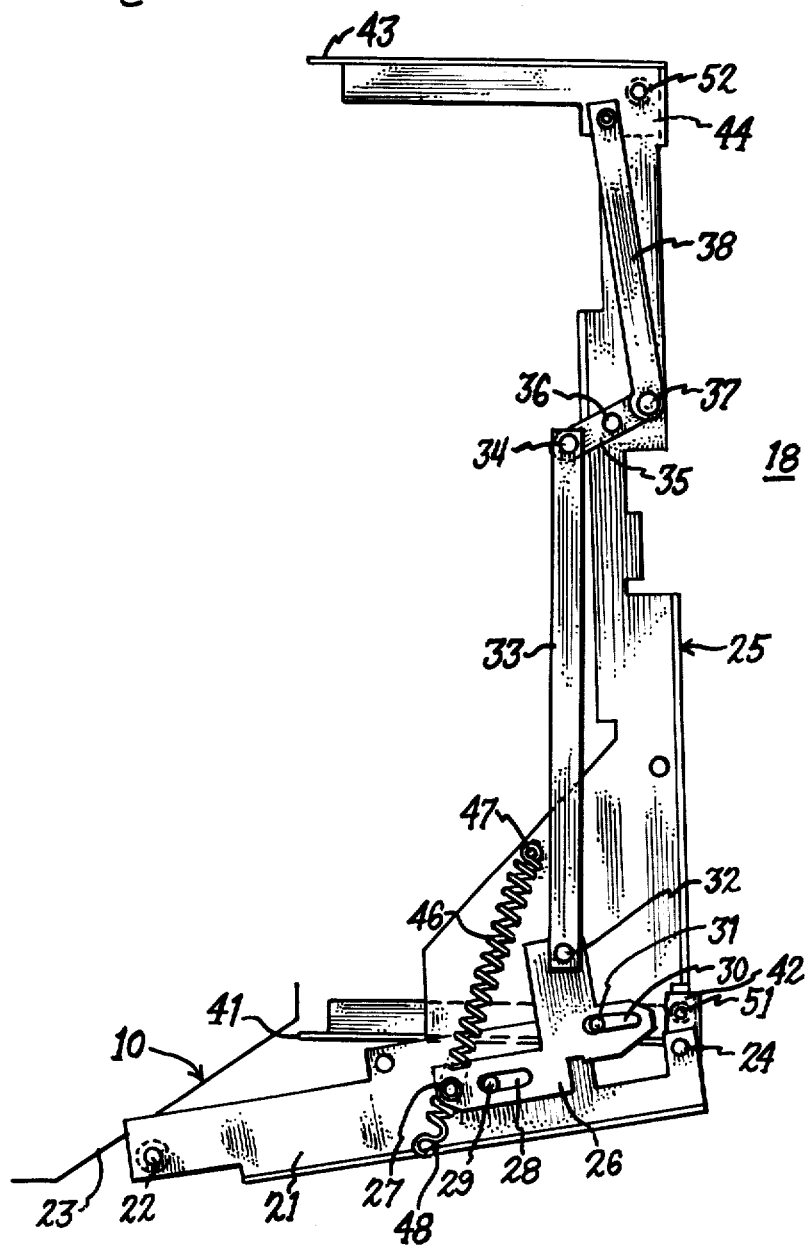
FIG. 2 is a side view of the shield operating mechanism of FIG. 1 with the breaker partially within the compartment.

FIG. 2 shows shield operating mechanism 18 with upper and lower moveable shields 43, 41 in a fully open position. Primary operating arm pin 22 is in contact with the lower-most portion of circuit breaker lower surface 23 and return spring 46 is extended. First pin 29 is shown in contact with the rear surface of first slot 28 and second pin 31 is shown captured against the rear surface of second slot 30. Lower expansion link 33 is drawn downward with reversing bell crank link 35 rotated slightly less than 180° around pivot 40 and upper expansion link 38 extended in the upward direction.

When circuit breaker 10 is withdrawn from breaker compartment 16 so that lower surface 23 no longer contacts primary operator arm pin 22, return spring 46 rapidly draws primary operating arm 21 into the upward position indicated in FIG. 1 with lower shield hinge 42 and attached lower moveable shield 41 as well as upper moveable shield hinge 44 and attached upper moveable shield 43 into their completely closed position.

Figure 3:
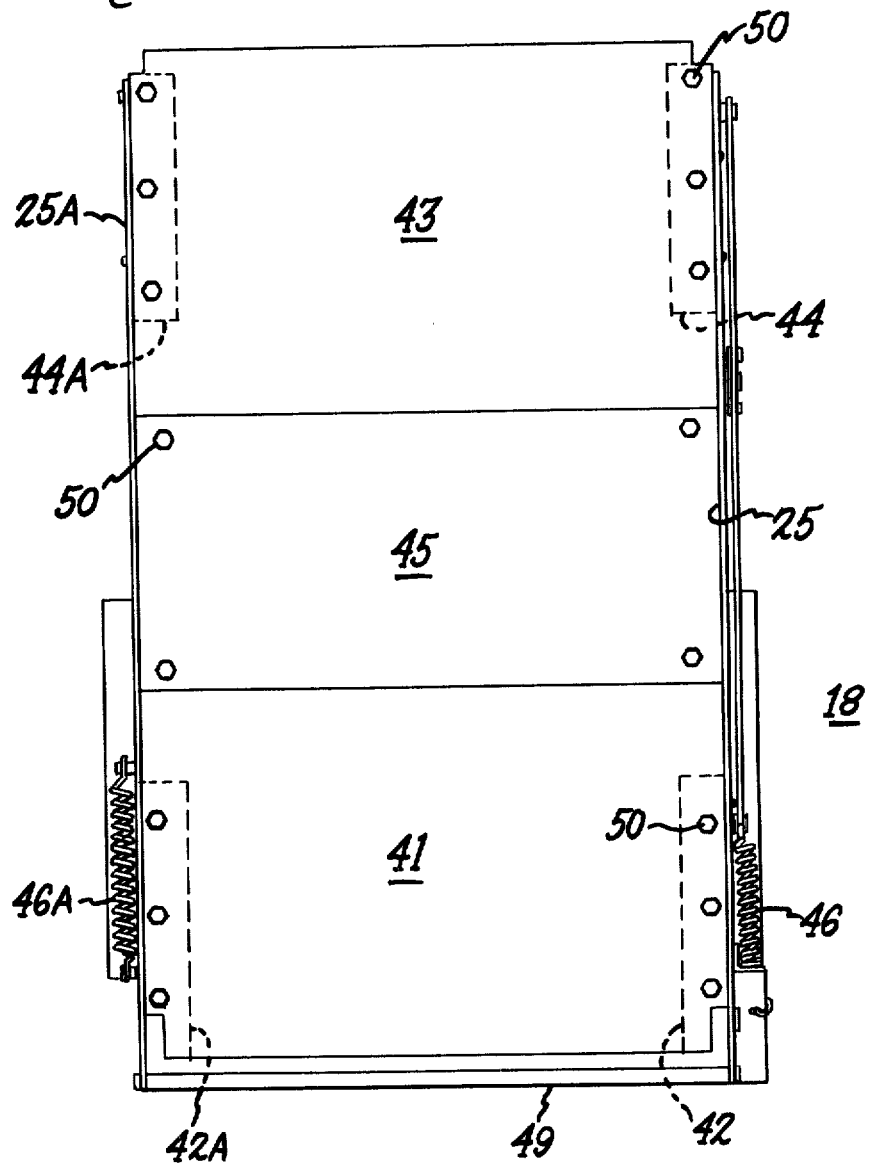
FIG. 3 is a front view of the shield operating mechanism of the invention with the upper and lower shields in a closed configuration.

FIG. 3 shows shield operating mechanism 18 in the closed configuration depicted earlier in FIG. 1. Also shown is a complementary left side frame 25A, upper left moveable shield hinge 44A, lower moveable shield hinge 42A and left return spring 46A. Lower moveable shield hinge 42 is connected with lower moveable shield left hinge 42A by means of lower moveable shield 41. Movement of lower hinge 42 and lower moveable shield 41 forces lower moveable shield 41 to move against return spring 46 on right side frame 25 as well as left return spring 46A on left side frame 25A. Side frame 25 is connected to side frame 25A by connecting rod 49 and by stationary shield 45. A plurality of bolts 50 are employed to attach upper moveable shield 43 to upper hinge 44 on right side frame 25 and upper left hinge 44A on left side frame 25A. A corresponding plurality of bolts 50 are employed to attach lower moveable shield hinge 42 and left lower moveable shield left hinge 42A to lower moveable shield 41.

I claim:

1. A shield operating mechanism for a circuit breaker compartment comprising:
   a side support frame;
   an upper moveable shield hingeably attached to a top portion of said side support frame;
   a lower moveable shield hingeably attached to a bottom portion of said support frame;
   a primary operating arm hingeably attached to said bottom portion of said side support frame for contacting a rear portion of a circuit breaker;
   an upper and a lower expansion link interconnected by means of a rotatably mounted connecting link, said lower expansion link connected with means for opening said lower moveable shield when said primary operating arm is moved in a downward direction and said upper expansion link containing means for opening said upper moveable shield when said primary operating arm is moved in a downward direction.

2. The shield operating mechanism of claim 1 wherein said lower moveable shield means comprises an intermediate lever pivotally connected with said primary operating arm and pivotally connected with one end of said lower expansion link.

3. The shield operating mechanism of claim 2 wherein said intermediate lever includes means defining a first slot for capturing a first pin extending from said primary operating arm and means defining a second slot for capturing a second pin extending from said lower moveable shield.

4. The shield operating mechanism of claim 1 further including a return spring connecting between said side support frame and said primary operating arm for returning said primary operating arm to an upward position when said circuit breaker is removed from said breaker compartment.

5. The shield operating mechanism of claim 1 including a stationary shield attached to said side support frame intermediate said upper and said lower moveable shields for providing a stop to said upper and lower shields.

6. The shield operating mechanism of claim 1 including an upper hinge attached to both said side support frame and said upper moveable shield and a lower hinge attached to both said side support frame and said lower moveable shield.

7. A shield operating mechanism for isolating power and load stabs within a circuit breaker compartment comprising:
   a support frame;
   an upper moveable shield hingeably attached to an upper portion of said side support frame and a lower moveable shield hingeably attached to a lower portion of said side support frame;
   a primary operating arm pivotably connected to said side support frame at one point and connected to said side support frame at another point by means of an extension spring;
   an intermediate lever pivotably connected with said primary operating arm and including means defining a first slot for capturing a pin extending from said primary operating arm and means defining a second slot for capturing a pin extending from a lower hinge;
   a lower expansion link connected at a bottom end to said intermediate lever and at a top end to a reversing bell crank link, said bell crank link being pivotably attached to said side support frame; and
   an upper expansion link attached at a bottom end to said reversing bell crank link and at an upper end to an upper hinge;
   whereby a circuit breaker contacts said primary operating arm forcing said arm into a downward direction causing said extension spring to become extended and causing said lower hinge to rotate into an open counterclockwise position and said upper hinge to rotate into an open clockwise position, said primary operating arm returning to an upward position upon removing said circuit breaker thereby causing said lower moveable shield to rotate in a clockwise closed position and said upper moveable shield to rotate in a counterclockwise closed position.

8. A circuit breaker compartment comprising:
   means for slideably receiving a circuit breaker, said circuit breaker having a plurality of line and load plugs on a back surface thereof;
   a corresponding plurality of line and load stabs extending from a rear surface of said compartment for mating with said circuit breaker line and load plugs;
   a shield operating mechanism containing:

a primary operating arm hingeably attached at one end to right side frame and attached intermediate its end to said right side frame by means of a right return spring;

an intermediate lever pivotably attached to said primary operating arm and containing first slot means for capturing a pin extending from said primary operating arm and second slot means for capturing a pin extending from a lower hinge;

a lower moveable shield attached to said lower hinge for providing isolation to said load stabs within said compartment;

a lower expansion link connected at a bottom end with said intermediate lever and at a top end with one end of a reversing bell crank link, said reversing bell crank link being pivotably connected to said right side frame;

an upper expansion link connected at a bottom end with an opposite end of said reversing bell crank link and at a top end with an upper hinge, said upper hinge being attached to said right side frame; and an upper moveable shield connected with said upper hinge for providing isolation to said line stabs within said compartment; and a left side frame within said compartment oppositely adjacent said right side frame;

a left return spring connecting between said left side frame and a left lower hinge, said left lower hinge being attached to said lower moveable shield;

a connecting rod extending between said right side frame and said left side frame;

a stationary shield extending between said right side frame and said left side frame; and a left upper hinge connected to said left side frame and said upper moveable shield;

whereby movement of said upper and said lower moveable shields is opposed by the combined forces exerted by both said left return spring and said right return spring.

* * * * *